United States Patent
Varga et al.

(10) Patent No.: US 12,519,735 B2
(45) Date of Patent: Jan. 6, 2026

(54) DETERMINISTIC NETWORKING OPERATIONS ADMINISTRATION AND MAINTENANCE FOR DETERMINISTIC NETWORK SERVICE SUB-LAYER

(71) Applicant: Telefonaktiebolaget LM Ericsson (publ), Stockholm (SE)

(72) Inventors: Balázs Varga, Budapest (HU); János Farkas, Kecskemét (HU); György Miklós, Pilisborosjenő (HU); János Szabó, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/565,257

(22) PCT Filed: Jun. 3, 2022

(86) PCT No.: PCT/EP2022/065164
§ 371 (c)(1),
(2) Date: Nov. 29, 2023

(87) PCT Pub. No.: WO2022/253996
PCT Pub. Date: Dec. 8, 2022

(65) Prior Publication Data
US 2024/0259326 A1    Aug. 1, 2024

Related U.S. Application Data

(60) Provisional application No. 63/196,760, filed on Jun. 4, 2021.

(51) Int. Cl.
*H04L 47/28* (2022.01)
*H04L 41/0213* (2022.01)
*H04L 47/34* (2022.01)

(52) U.S. Cl.
CPC .......... *H04L 47/28* (2013.01); *H04L 41/0213* (2013.01); *H04L 47/34* (2013.01)

(58) Field of Classification Search
CPC ......... H04L 43/12; H04L 43/10; H04L 45/24; H04L 43/50; H04L 12/1407;
(Continued)

(56) References Cited

U.S. PATENT DOCUMENTS

| | | | | |
|---|---|---|---|---|
| 10,979,350 | B1* | 4/2021 | Nainar | H04L 45/44 |
| 2021/0105668 | A1* | 4/2021 | Thubert | H04L 45/42 |
| 2024/0106751 | A1* | 3/2024 | Yu | H04L 45/50 |

OTHER PUBLICATIONS

International Search Report and Written Opinion of the International Searching Authority, PCT/EP2022/065164, mailed Sep. 20, 2022, 14 pages.
Stokes, Olen et al., "OAM (Operation, Administration and Maintenance) for Virtual Private LAN Service (VPLS) draft-stokes-vkompella-12vpn-vpls-oam-ol.txt," Nov. 18, 2007, 46 pages.
(Continued)

*Primary Examiner* — Djenane M Bayard
(74) *Attorney, Agent, or Firm* — Sage Patent Group

(57) ABSTRACT

There is provided a method performed by a relay node of a deterministic network ("DetNet") for providing operation, administration, and maintenance ("OAM") for the DetNet. The method includes receiving a first OAM message including an indication of a target node. The method further includes, responsive to receiving the first OAM message, determining whether the relay node is the target node. The method further includes transmitting a second OAM message based on whether the relay node is the target node. There is also provided a method performed by an origination node. In further embodiments a network entity, computer program, computer program product, or non-transitory computer readable medium are provided.

17 Claims, 8 Drawing Sheets

(58) Field of Classification Search
CPC ........... H04L 2101/663; H04L 41/0806; H04L 41/5003; H04L 43/08; H04L 43/0817; H04L 43/20; H04L 45/123; H04L 45/50; H04L 45/645; H04L 61/5007; H04L 45/02; H04L 45/20; H04L 45/22; H04L 45/74; H04L 47/2483; H04L 1/08; H04L 1/1642; H04L 1/18; H04L 1/22; H04L 12/4633; H04L 2012/5625; H04L 41/34; H04L 43/0835; H04L 45/28; H04L 45/34; H04L 45/42; H04L 45/48; H04L 45/741; H04L 47/24; H04L 47/32; H04L 47/34; H04L 47/35; H04L 69/06; H04L 69/161; H04L 69/22; H04L 41/0213; H04L 41/0668; H04L 41/0896; H04L 41/5009; H04L 45/12; H04L 45/124; H04L 45/125; H04L 45/302; H04L 45/38; H04L 45/44; H04L 45/507; H04L 47/28; H04L 47/724; H04L 47/803; H04L 47/824; H04L 67/10; H04L 67/1063; H04L 67/12; H04L 67/51; H04L 67/61; H04L 69/08; H04L 69/24
See application file for complete search history.

(56) References Cited

OTHER PUBLICATIONS

Mirksy, G. et al., "Operations, Administration and Maintenance (OAM) for Deterministric Networks (DetNet) with MPLS Data Plane draft-ietf-detnet-mpls-oam-03," Det Net Working Group, Mar. 30, 2021, 12 pages.

IEEE Standards Association, IEEE Standard for Local and metropolitan area networks—Fram Replication and Elimination for Reliability, IEEE Std 802.1 CB(TM)-2017, 102 pages.

Finn, N. et al., "RFC 8655 Deterministic Networking Architecture," Internet Engineering Task Force (IETF), Oct. 2019, 38 pages.

* cited by examiner

DETERMINISTIC NETWORKING OPERATIONS ADMINISTRATION AND MAINTENANCE FOR DETERMINISTIC NETWORK SERVICE SUB-LAYER

CROSS REFERENCE TO RELATED APPLICATIONS

This application is a 35 U.S.C. § 371 national stage application of PCT International Application No. PCT/EP2022/065164 filed on Jun. 3, 2022, which in turn claims domestic priority to U.S. Provisional Patent Application No. 63/196,760, filed on Jun. 4, 2021, the disclosures and content of which are incorporated by reference herein in their entirety.

TECHNICAL FIELD

The present disclosure is related to wireless communication systems and more particularly to deterministic networking ("DetNet") operations administration and maintenance ("OAM") for DetNet service sub-layer.

BACKGROUND

FIG. 1 illustrates an example of a new radio ("NR") network (e.g., a 5th Generation ("5G") network) including a 5G core ("5GC") network 130, network node 120 (e.g., a 5G base station ("gNB")), multiple communication devices 110 (also referred to as user equipment ("UE")).

The internet engineering task force ("IETF") has been working on the development of deterministic networking ("DetNet") related functionalities/toolboxes for internet protocol ("IP") and multiprotocol label switching ("MPLS") networks. In IETF the DetNet working group focuses on deterministic data paths that can provide bounds on latency, loss, and packet delay variation (jitter), and provide high reliability. The working group addresses Layer 3 methods in support of applications requiring deterministic networking. DetNet focuses on aspects which are required to enable a multi-hop path, and forwarding along the path, with the deterministic properties of controlled latency, low packet loss, low packet delay variation, and high reliability. Layer 3 data plane technologies that can be used in DetNet networks include: IP and MPLS.

DetNet has defined two sub-layers: (1) DetNet service sub-layer, at which a DetNet service (e.g., service protection) is provided; and (2) DetNet forwarding sub-layer, which optionally provides resource allocation for DetNet flows over paths provided by the underlying network.

FIG. 2 illustrates an example of DetNet sub-layers. New DetNet-specific functions have been defined for the DetNet service sub-layer, namely packet replication, elimination, and ordering functions ("PREOF").

A DetNet relay node is a network node that includes a service sub-layer function that interconnects different DetNet forwarding sub-layer paths to provide service protection. A DetNet relay node participates in the DetNet service sub-layer. It typically incorporates DetNet forwarding sub-layer functions as well, in which case it is collocated with a transit node.

Operation, Administration, and Maintenance ("OAM") tools are essential to maintain a deterministic network. With the implementation of the OAM in DetNet, an operator will have a real-time view of the network infrastructure regarding the network's ability to respect the Service Level Objective, such as packet delay, delay variation, packet loss ratio, and in-order-delivery assigned to each data flow.

SUMMARY

In some embodiments, a method performed by a relay node of a deterministic network ("DetNet") is provided for providing operation, administration, and maintenance ("OAM") for the DetNet. The method includes receiving a first OAM message comprising an indication of a target node. The method further includes, responsive to receiving the first OAM message, determining whether the relay node is the target node. The method further includes transmitting a second OAM message based on whether the relay node is the target node.

In other embodiments, a method performed by an origination node of a deterministic network ("DetNet") is provided for providing operation, administration, and maintenance ("OAM") for the DetNet. The method includes generating a first OAM message comprising an indication of a target node. The method further includes transmitting the first OAM message to the target node via a communication path shared with a data flow. The method further includes, responsive to transmitting the first OAM message, receiving a second OAM message from the target node.

In other embodiments, a network entity, computer program, computer program product, or non-transitory computer readable medium may be provide for performing either of the methods above.

Various embodiments herein describe that a "DetNet PING" can provide a new OAM shim layer to provide OAM for the DetNet service sub-layer. In some examples, the "DetNet PING" allows discovery of DetNet relay nodes in a DetNet network. In additional or alternative examples, the "DetNet PING" allows collection of DetNet service sub-layer specific (configuration/operation/status) information from DetNet relay nodes. In additional or alternative examples, the "DetNet PING" can work for both DetNet data planes: MPLS and IP.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
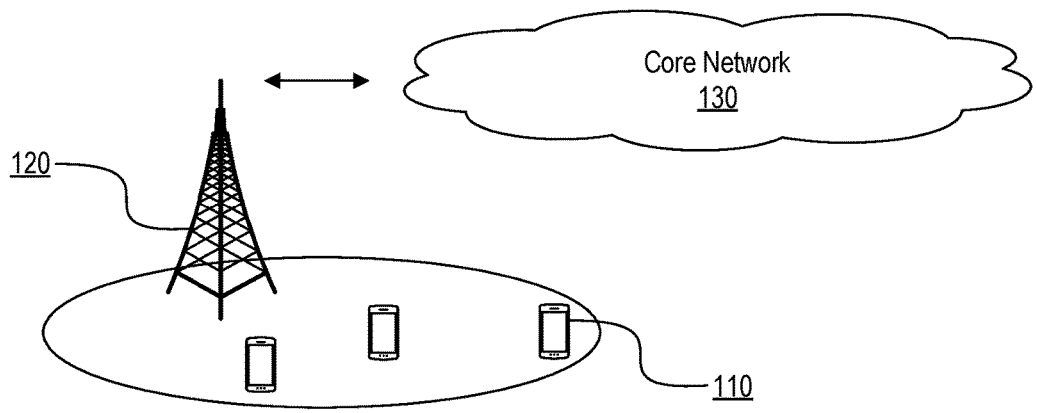
FIG. 1 is a schematic diagram illustrating an example of a 5th generation ("5G") network.
Figure 2:
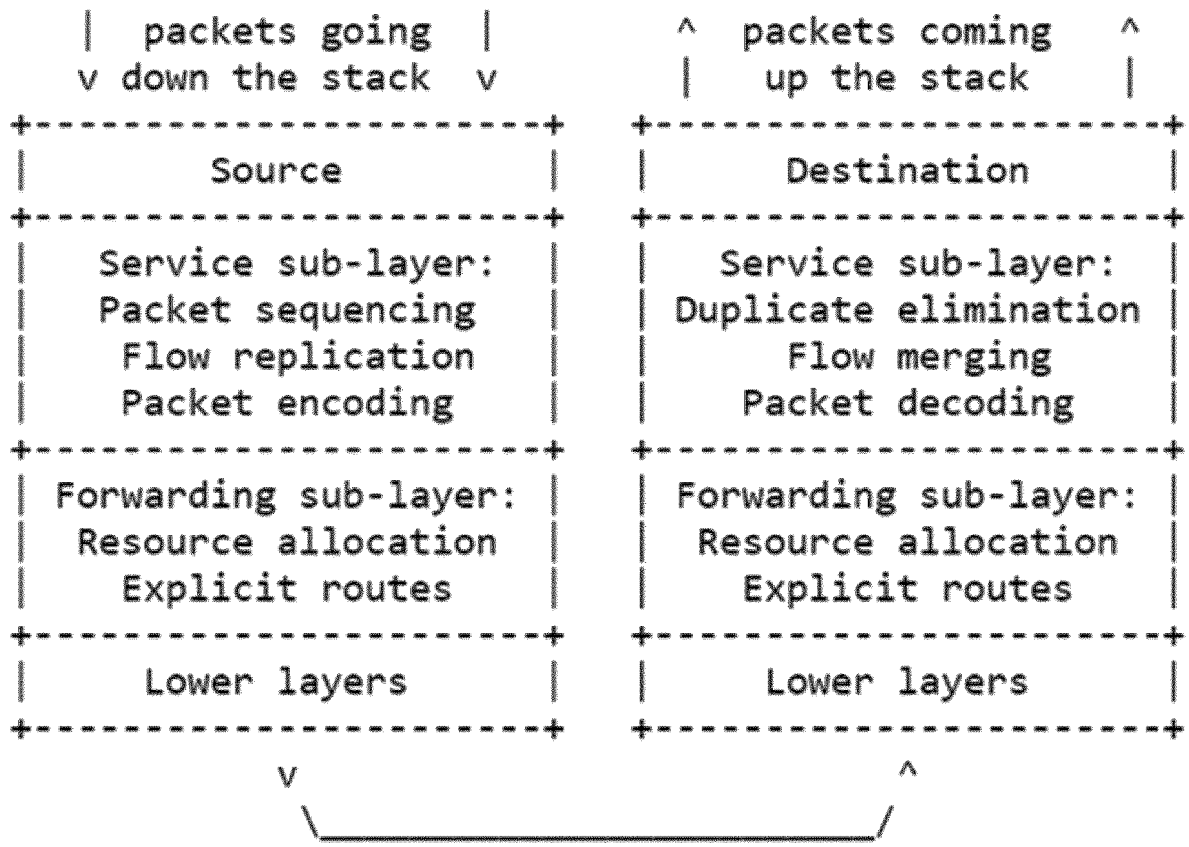
FIG. 2 is a diagram illustrating an example of DetNet sub-layers.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various embodiments herein focus on the technical details of a deterministic network ("DetNet") service sub-layer specific operation, administration, and maintenance ("OAM") function.

A DetNet service sub-layer defines special functions not used before in packet networks, therefore no related OAM functions were defined. Existing OAM functions cannot serve packet replication, elimination, and ordering functions ("PREOF") functionalities (e.g., to recognize/discover a packet replication function ("PRF"), a packet elimination function ("PEF"), or a packet ordering function ("POF") points location/configuration and check their operation or status).

There currently exist certain challenges. For example, OAM does not exist for DetNet service sub-layer functions. DetNet service sub-layer functions use a sequence number that is added to the data flow at the source or at the edge of the DetNet domain. The sequence numbers are continuously transmitted 1-by-1 (e.g., there is no "hole" in the sequence). This characteristic prohibits adding easily any additional packet (e.g., OAM packets) that can travel with the data flow along the same path/service that the data flow is going through. However, for OAM it is essential to share the faith. Furthermore placing OAM Maintenance EndPoints ("MEPs")/Maintenance Intermediate Points ("MIPs") at any location along the path of the data flow is not possible, which can be an essential function for OAM (e.g., for effectively localize failures). Therefore, prior to the current innovations, there was no option for OAM to use the same path/service as the data flow, to be able to place MEPs/MIPs without restrictions, and to provide information about DetNet service sub-layer functions.

Certain aspects of the disclosure and their embodiments may provide solutions to these or other challenges. In some embodiments, a new OAM shim layer provides OAM for a DetNet service sub-layer. In some examples, a "DetNet PING" is introduced, which is an in-band OAM procedure that uses extra packets for OAM to provide DetNet service sub-layer specific information. The DetNet service sub-layer specific information can include: an identity of a DetNet service sub-layer node; information indicating an ingress/egress flow specific configuration of a DetNet service sub-layer node; and information usable to detect the status of the flow specific service sub-layer function.

In-band OAM can indicate that OAM packets follow precisely the same path as the data packets of the corresponding DetNet flow. In some examples, the DetNetPING (also referred to herein as OAM) packets carry information identifying a DetNet flow that makes them be treated like ordinary DetNet packets in some nodes (e.g., transit nodes) and makes them (in all nodes) follow the same paths as the DetNet flow until reaching their OAM destination. However, the OAM packets also have their own sequence numbers that are distinct and separate from the DetNet sequence numbers of the flow and these separate sequence numbers are used for packet elimination.

Certain embodiments may provide one or more of the following technical advantages. In some embodiments, a "DetNet PING" described herein can provide a new OAM shim layer to provide OAM for the DetNet service sub-layer. In some examples, the "DetNet PING" allows discovery of DetNet relay nodes in a DetNet network. In additional or alternative examples, the "DetNet PING" allows collection of DetNet service sub-layer specific (configuration/operation/status) information from DetNet relay nodes. In additional or alternative examples, the "DetNet PING" can work for both DetNet data planes: MPLS and IP.

In some embodiments, a "DetNet PING" procedure uses two types of packets: (1) a DetNet-Echo-Request; and (2) a DetNet-Echo-Reply. In some examples, the two types of DetNet PING packets (also referred to herein as OAM flow) can have an encapsulation that is identical to the corresponding DetNet data flow encapsulation, so they follow precisely the same path as the packets of the corresponding DetNet data flow. The OAM flow may only target DetNet service sub-layer entities, so that the OAM flow is not recognized by entities not implementing DetNet service sub-layer for a packet flow. Other entities may treat the OAM flow as packets belonging to the related DetNet flow.

Figure 3:
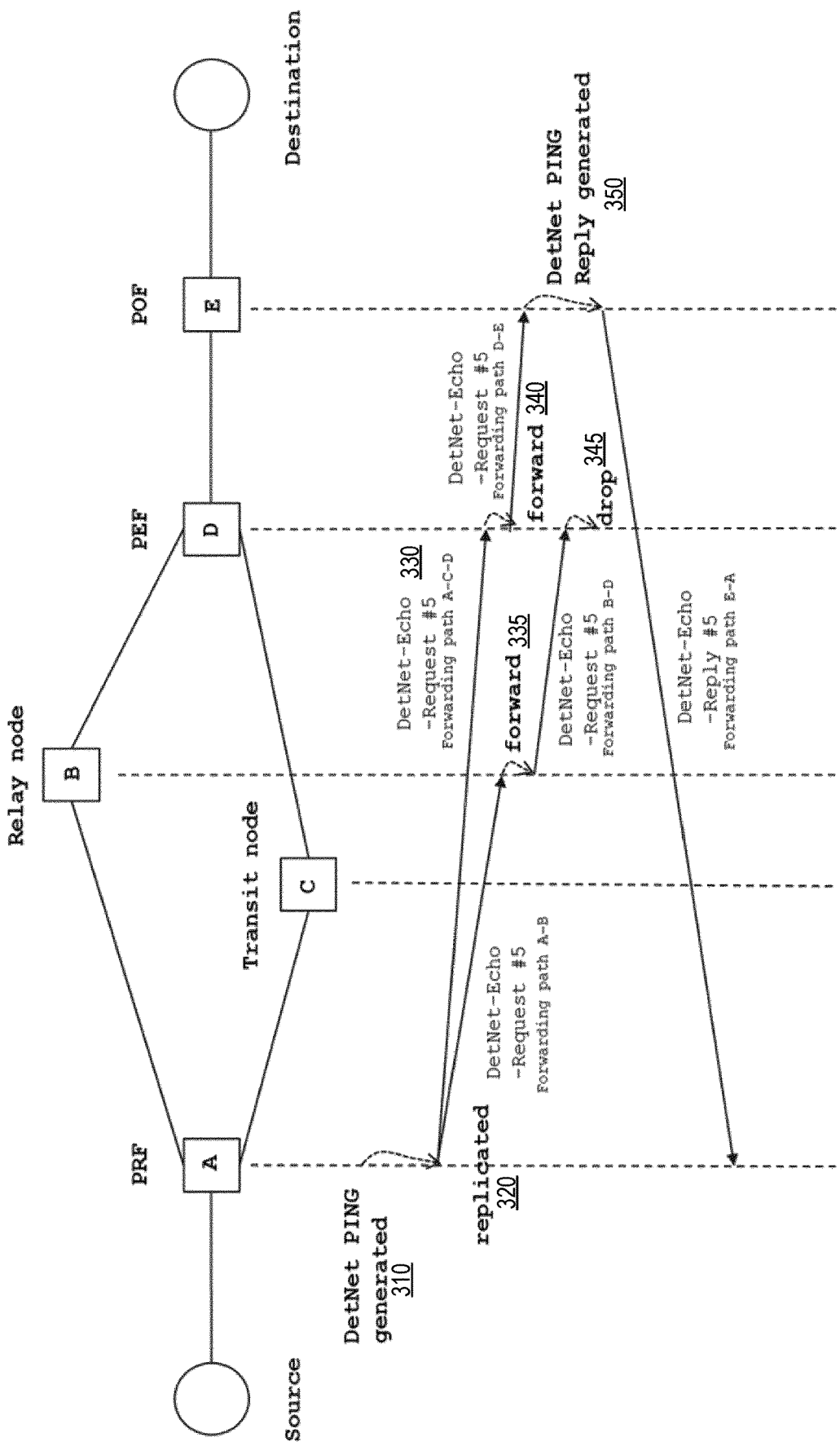
FIG. 3 is a signal flow diagram illustrating an example of a DetNet PING procedure according to some embodiments of inventive concepts.

FIG. 3 illustrates an example of a signal flow during a "DetNet PING" procedure between nodes of a DetNet. In some examples, the nodes include: an originator node, intermediate DetNet service sub-layer nodes, and a target node. An originator node sends (e.g., generates) a DetNet-Echo-Request packet. The DetNet-Echo-Request can include an OAM specific "PINGSeqNum," that can be used at DetNet service sub-layer nodes. The "PINGSeqNum" can be originator specific. The intermediate DetNet service sub-layer nodes can execute DetNet flow specific service sub-layer functionality (e.g., execution may be done in an OAM specific manner). The targeted node can answer the DetNet-Eco-Request packet with a DetNet-Echo-Reply packet. The DetNet-Echo-Reply can provide DetNet service sub-layer specific information on: identities of DetNet service sub-layer node (e.g., Node-ID, local Flow-ID, . . . ); Ingress/Egress flow related configuration (e.g., in/out member flow specific information (including forwarding sub-layer specifics), . . . ); and status of service sub-layer function (e.g., local PxF-ID, Action-Type=x, operational status, value of key state variable(s), function related counters, . . . ).

In some embodiments, at a relay node with PRF, DetNet OAM packets are stateless processed. In some examples, if the relay node is the target of a DetNet-Echo-Request packet, then the DetNet-Echo-Request packet is not further forwarded and a DetNet-Echo-Reply packet is generated.

Otherwise, a DetNet-Echo-Request packet is sent over all DetNet flow specific member flow paths (e.g., it is replicated). The DetNet-Echo-Reply packet can include the following information: identities of the DetNet service sub-layer node (e.g., Node-ID, local Flow-ID); Ingress/Egress flow related configuration (e.g., in/out member flow specific information (including forwarding sub-layer specifics)); and status of service sub-layer function (e.g., local PRF-ID, Action-Type=Replication, operational status, value of the flow related key state variable "GenSeqNum", optionally some PRF function related counters).

In some embodiments, at a relay node with PEF, DetNet OAM packets are stateful processed. In some examples, if this node is the target of a DetNet-Echo-Request packet, then the DetNet-Echo-Request packet is not further forwarded and a DetNet-Echo-Reply packet is generated. Otherwise, elimination is executed on the DetNet-Echo-Request packet using the OAM specific "PINGSeqNum" in the packet, so only a single DetNet-Echo-Request packet is forwarded and all further replicas (e.g., having the same originator's sequence number) are discarded (e.g., "MatchRecoveryAlgorithm" fits for most cases as OAM is a slow protocol). The DetNet-Echo-Reply packet can include the following information: identities of the DetNet service sub-layer node (e.g., Node-ID, local Flow-ID); Ingress/Egress flow related configuration (e.g., in/out member flow specific information (including forwarding sub-layer specifics)); and status of service sub-layer function (e.g., local PEF-ID, Action-Type=Elimination, operational status, value of the flow related key state variable "RecovSeqNum", optionally some PEF function related counters).

In some embodiments, at a relay node with POF, DetNet OAM packets are stateless processed. In some examples, if this node is the target of a DetNet-Echo-Request packet, then the DetNet-Echo-Request packet is not further forwarded, and a DetNet-Echo-Reply packet is generated. Otherwise, a DetNet-Echo-Request packet is immediately forwarded (no ordering is done). The DetNet-Echo-Reply packet can include the following information: identities of the DetNet service sub-layer node (e.g., Node-ID, local Flow-ID); Ingress/Egress flow related configuration (e.g., in/out member flow specific information (including forwarding sub-layer specifics)); and status of service sub-layer function (e.g., local POF-ID, Action-Type=Ordering, operational status, value of the flow related key state variable "POFLastSent", optionally some POF function related counters).

In some embodiments, at a relay node without PREOF, DetNet OAM packets are stateless processed. In some examples, if this node is the target of a DetNet-Echo-Request packet, then the DetNet-Echo-Request packet is not further forwarded, and a DetNet-Echo-Reply packet is generated. Otherwise, the DetNet-Echo-Request packet is forwarded (as any data packets of the related flow). The DetNet-Echo-Reply packet can include the following information: identities of the DetNet service sub-layer node (e.g., Node-ID, local Flow-ID); Ingress/Egress flow related configuration (e.g., in/out member flow specific information (including forwarding sub-layer specifics)); and a status of service sub-layer function.

A DetNet transit node is a DetNet node, operating at the DetNet forwarding sub-layer, that utilizes link-layer and/or network-layer switching across multiple links and/or sub-networks to provide paths for DetNet service sub-layer functions. It typically provides resource allocation over those paths. An MPLS Label Switch Router ("LSR") is an example of a DetNet transit node.

The "DetNet PING" procedure described herein introduces a new OAM shim layer to provide OAM for DetNet service sub-layer. It allows discovering DetNet relay nodes in a DetNet network, collecting DetNet service sub-layer specific (configuration/operation/status) information from DetNet relay nodes, and can work for both DetNet data plane: MPLS and IP.

FIG. 3 illustrates an example of how DetNet service sub-layer specific OAM packets are handled by relay nodes. In this example, the target of the DetNet-Echo-Request is Node-E. Node-A is a PRF node, Node-B is a relay node without PREOF, Node-C is a transit node, Node-D is a PEF node, and Node-E is a POF node.

At block 310, a DetNet-Echo-Request is generated by Node-A. At block 320, Node-A replicates the DetNet-Echo-Request and transmits a version of the DetNet-Echo-Request to each of Node-B and Node-C. The DetNet-Echo-Request transmitted to Node-C is forwarded on to Node-D in response to Node-D being a transit node (e.g., without delay). At block 335, Node-B receives a version of the DetNet-Echo-Request, determines that it is not the target node, and forwards the DetNet-Echo-Request to Node-D. At block 340, Node-D receives the version of the DetNet-Echo-Request via Node-C, determines it is not the target, that it has not previously received the DetNet-Echo-Request (e.g., based on a "PINGSeqNum" in the DetNet-Echo-Request), and forwards the DetNet-Echo-Request to Node-E. At block 345, Node-D receives the version of the DetNet-Echo-Request via Node-B, and drops (e.g., does not forward) the DetNet-Echo-Request based on determining that the DetNet-Echo-Request was previously received (at block 340). At block 350, Node-E receives the DetNet-Echo-Request, determines it is the target, and transmits a DetNet-Echo-Response based on Node-E being the target.

Figure 4:
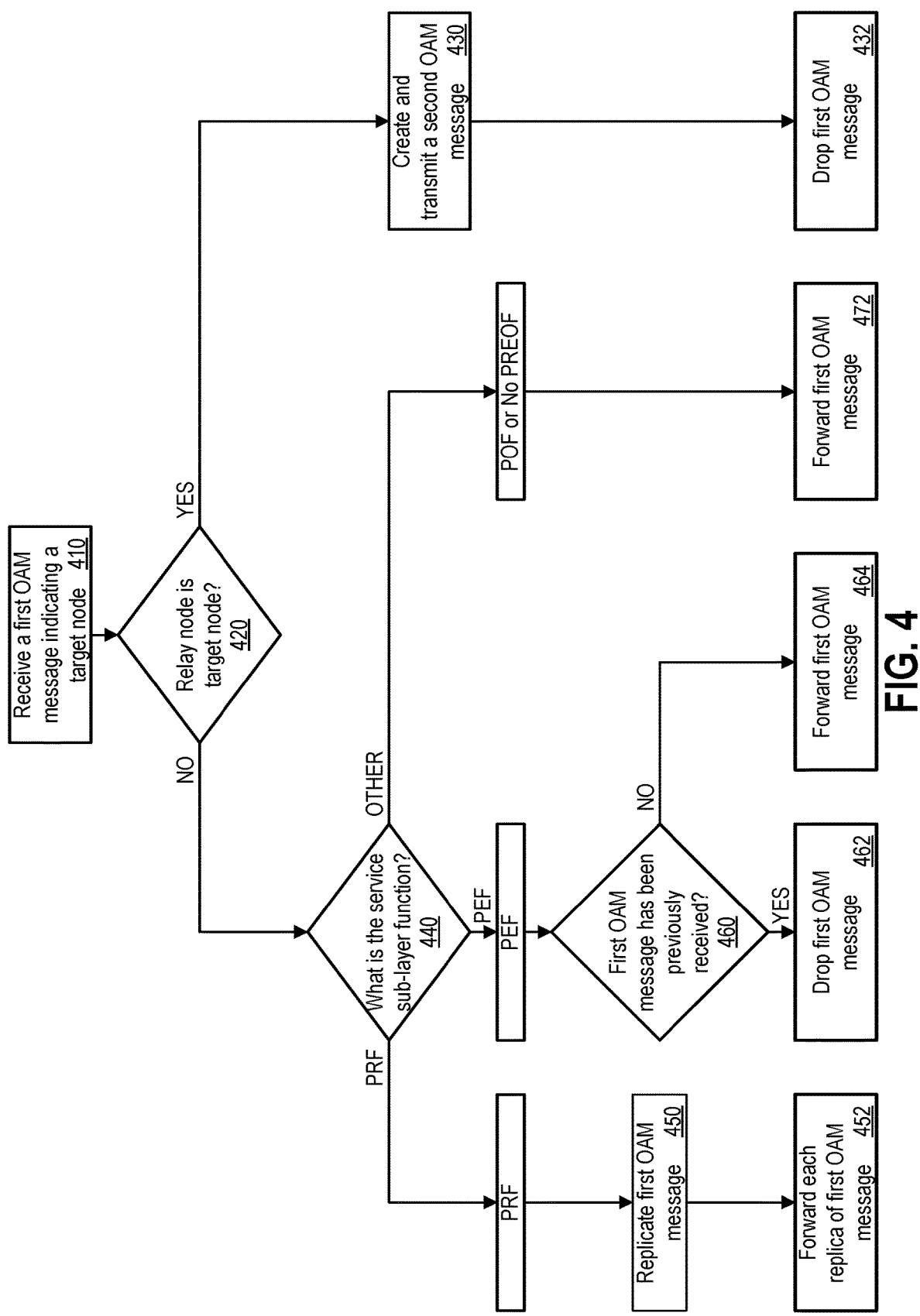
FIG. 4 is a flow chart illustrating an example of operations performed by a node during a DetNet PING procedure according to some embodiments of inventive concepts.

FIG. 4 is a flow chart illustrating an example of operations performed by a relay node in response to receiving a first OAM message indicating a target node (block 410). In some embodiments, the DetNet PING procedure is an in-band OAM procedure, which means that the OAM packets follow precisely the same path as the data packets of the corresponding DetNet flow. In some examples, the OAM packets carry information identifying a DetNet flow that makes them be treated like ordinary DetNet packets in some nodes (e.g., transit nodes) and makes them (in all nodes) follow the same paths as the DetNet flow until reaching their OAM destination.

In this example, in response to receiving the first OAM message, the relay node determines whether the relay node is the target node (block 420). In response to determining that the relay node is the target node, the relay node creates and transmits a second OAM message (block 430) and drops the first OAM message (block 432). In response to determining that the relay node is not the target node, the relay node determines a service sub-layer function associated with the relay node (block 440). In response to determining that the relay node is associated with a PRF, the relay node replicates the first OAM message (block 450) and forwards each replica of the first OAM message (block 452).

In response to determining that the relay node is associated with a PEF, the relay node determines if the first OAM message has been previously received (block 460). The OAM packets may have their own sequence numbers that are distinct and separate from the DetNet sequence numbers of the flow and these separate sequence numbers are used for packet elimination by allowing the relay node to determine whether a OAM packet has been previously received. If the first OAM message has been previously received, the relay node drops the first OAM message (block 462). Otherwise, if the first OAM message has not been previously received, the relay node forwards the first OAM message (block 464).

Returning to block 440, if the relay node is associated with a service sub-layer function other than that a PRF or PEF (e.g., a POF or no PREOF), the relay node forwards the first OAM message (block 472).

In the description that follows, while the relay node may be any of the wireless device 712A, 712B, wired or wireless devices UE 712C, UE 712D, UE 800, virtualization hardware 1104, virtual machines 1108A, 1108B, UE 1206, network node 710A, 710B, 900, 1206, hardware 1104, virtual machine 1108A, 1108B, core network node 708, hardware 1104, or virtual machine 1108A, 1108B, the network node 900 shall be used to describe the functionality of the operations of the relay node. Operations of the network node 900 (implemented using the structure of FIG. 9) will now be discussed with reference to the flow chart of FIG. 5 according to some embodiments of inventive concepts. For example, modules may be stored in memory 904 of FIG. 9, and these modules may provide instructions so that when the instructions of a module are executed by respective processing circuitry 902, processing circuitry 902 performs respective operations of the flow chart.

Figure 5:
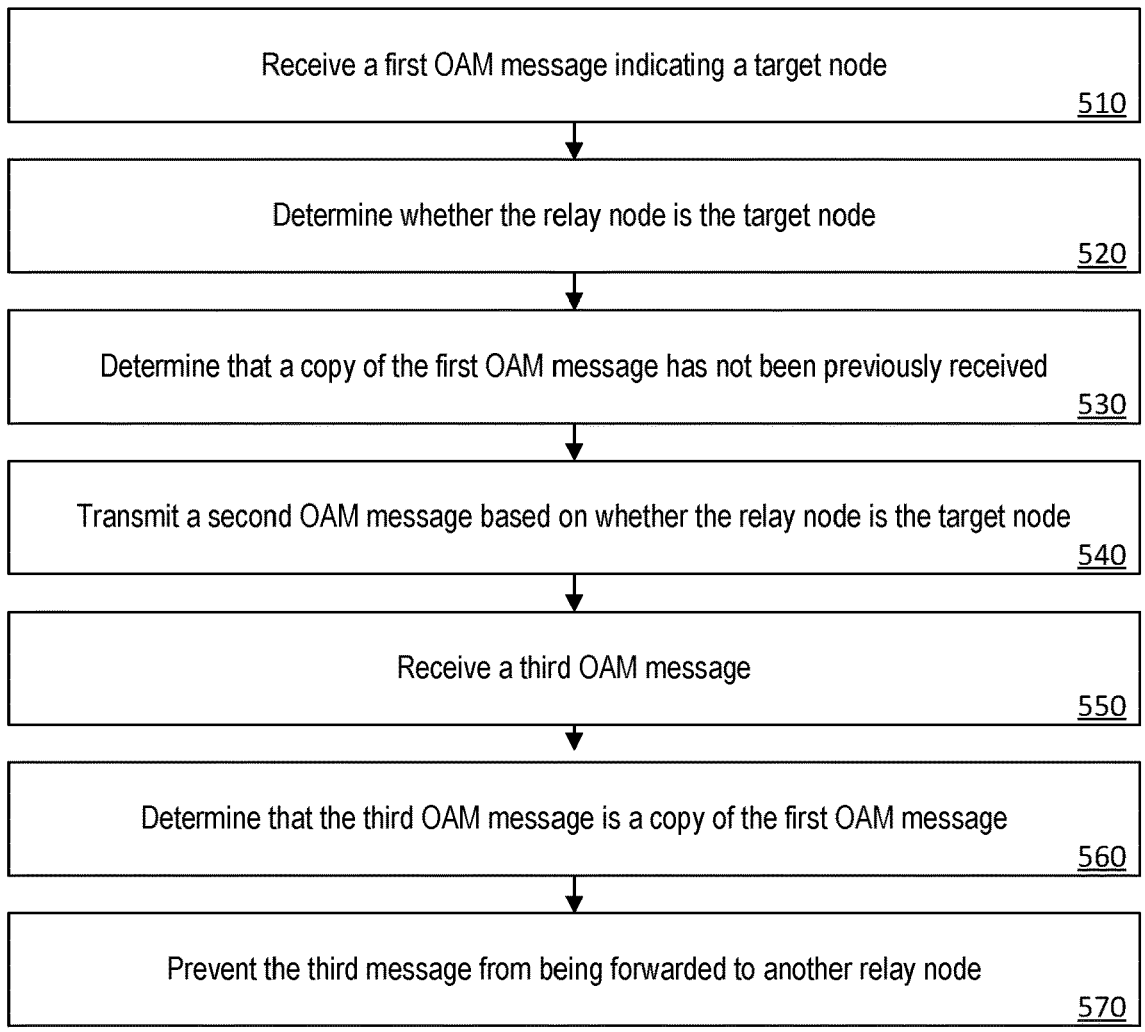
FIG. 5 is a flow chart illustrating operations of a relay node configured to handle a DetNet OAM procedure according to some embodiments of inventive concepts.

FIG. 5 is a flow chart illustrating an example of operations performed by a network node of a communications network for enabling internet protocol, IP, based deterministic networking ("DetNet"). In some embodiments, the communications network includes a 5th generation ("5G") network and the network node includes a core network ("CN") node configured to provide a DetNet application function.

At block 510, processing circuitry 902 receives, via network interface 707, a first OAM message indicating a target node. In some embodiments, the first OAM message further includes a value associated with an originator of the OAM message. In additional or alternative embodiments, receiving the first OAM message includes receiving the first OAM message from an originator of the OAM message via a communication path used by a data flow. The value is separate and distinct from a data flow specific sequence number associated with data packets of the data flow. In additional or alternative embodiments, the first OAM message includes a DetNet-Echo-Request message. The value can include an OAM specific ping sequence number.

At block 520, processing circuitry 902 determines whether the relay node is the target node.

At block 530, processing circuitry 902 determines that a copy of the first OAM message has not been previously received. In some embodiments, determining that a copy of the first OAM message has not been previously received by the relay node is based on evaluating the value. In some examples, the network node may only determine whether a copy of the first OAM message has been previously received in response to the network node not being the target node and the network node being associated with a PEF.

At block 540, processing circuitry 902 transmits, via network interface 906, a second OAM message based on whether the relay node is the target node. In some embodiments, determining whether the relay node is the target node includes determining that the relay node is not the target node. Transmitting the second OAM message can include, responsive to determining that the relay node is not the target node, forwarding the first OAM message to another node in the DetNet. In some examples, forwarding the first OAM message includes forwarding the first OAM message over multiple DetNet flow specific member flow paths to multiple nodes in the DetNet.

In some embodiments, determining whether the relay node is the target node includes determining that the relay node is the target node. In some examples, transmitting the second OAM message includes, responsive to determining that the relay node is the target node, transmitting the second OAM message to a source of the first OAM message, the second OAM message being different than the first OAM message. In additional or alternative embodiments, the second OAM message includes a DetNet-Echo-Reply packet that includes at least one of: an indicator of an identity of the relay node; an indicator of an ingress and/or egress flow related configuration; and a status of a service sub-layer function.

At block 550, processing circuitry 902 receives, via network interface 707, a third OAM message. In some embodiments, the network node determines whether the network node is a target node associated indicated in the third OAM message. At block 560, processing circuitry 902 determines that the third OAM message is a copy of the first OAM message. In some examples, the network node may only determine whether a copy of the third OAM message has been previously received in response to the network node not being the target node and the network node being associated with a PEF. At block 570, processing circuitry 902 prevents the third OAM message from being forwarded to another relay node. In some examples, the network node may only prevent the third message from being forwarded in response to the network node not being the target node and the network node being associated with a PEF. The network node may prevent the third OAM message from being forwarded by dropping the third OAM message.

In some embodiments, the relay node is configured to provide at least one of a packet replication function, PRF; a packet elimination function, PEF; and a packet ordering function, POF.

Various operations from the flow chart of FIG. 5 may be optional with respect to some embodiments of relay nodes and related methods. For example, operations of blocks 520, 550, 560, and 570 of FIG. 5 may be optional.

In the description that follows, while the origination node may be any of wireless device 712A, 712B, wired or wireless devices UE 712C, UE 712D, UE 800, virtualization hardware 1104, virtual machines 1108A, 1108B, UE 1206, network node 710A, 710B, 900, 1206, hardware 1104, virtual machine 1108A, 1108B, core network node 708, hardware 1104, or virtual machine 1108A, 1108B, the network node 900 shall be used to describe the functionality of the operations of the origination node. Operations of the network node 900 (implemented using the structure of FIG. 9) will now be discussed with reference to the flow chart of FIG. 6 according to some embodiments of inventive concepts. For example, modules may be stored in memory 904 of FIG. 9, and these modules may provide instructions so that when the instructions of a module are executed by respective processing circuitry 902, processing circuitry 902 performs respective operations of the flow chart.

At block 610, processing circuitry 902 generates a first OAM message indicating a target node. In some embodiments, generating the first OAM message includes generating the first OAM message to include a value associated with the origination node. In additional or alternative embodiments, the value is separate and distinct from a data flow specific sequence number associated with data packets of the data flow. In additional or alternative embodiments, the first OAM message includes a DetNet-Echo-Request message and the value includes an OAM specific ping sequence number.

At block 620, processing circuitry 902 transmits, via network interface 707, the first OAM message to the target node via a communication path shared with a data flow.

At block 630, processing circuitry 902 receives, via network interface 707, a second OAM message from the target node. In some embodiments, the second OAM message includes a DetNet-Echo-Reply packet that includes at least one of: an indicator of an identity of the relay node; an indicator of an ingress and/or egress flow related configuration; and a status of a service sub-layer function.

Figure 6:
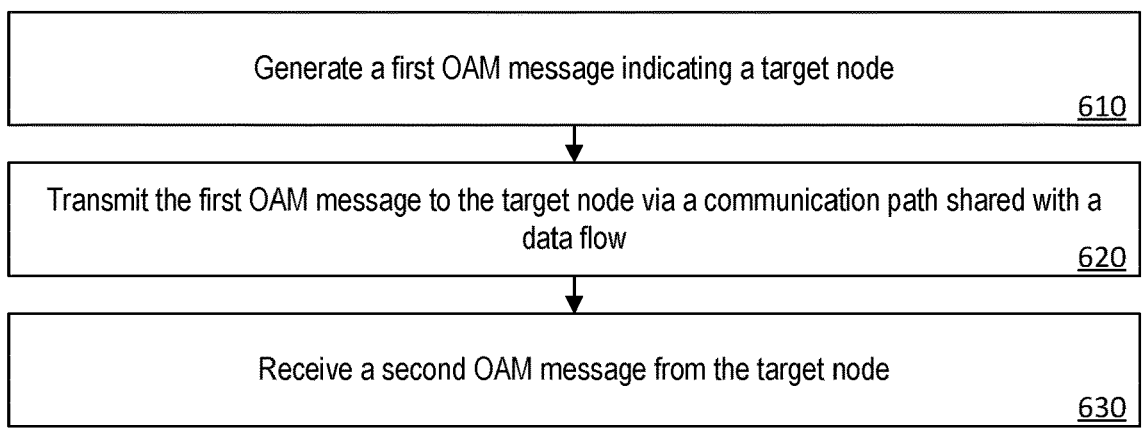
FIG. 6 is a flow chart illustrating operations of an origination node configured to handle a DetNet OAM procedure according to some embodiments of inventive concepts.

Various operations from the flow chart of FIG. 6 may be optional with respect to some embodiments of relay nodes and related methods.

Figure 7:
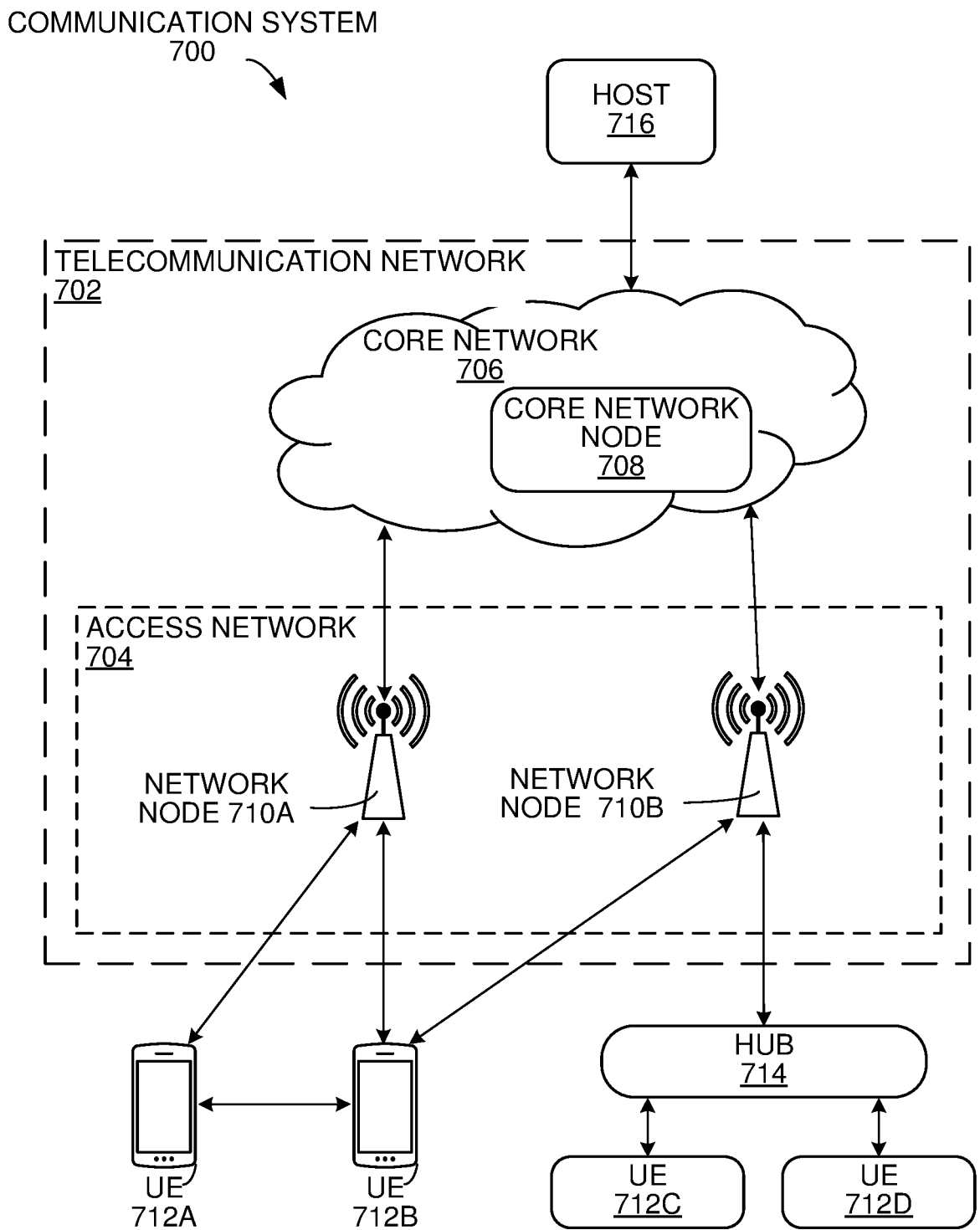
FIG. 7 is a block diagram of a communication system in accordance with some embodiments.

FIG. 7 shows an example of a communication system 700 in accordance with some embodiments.

In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710*a* and 710*b* (one or more of which may be generally referred to as network nodes 710), or any other similar 3rd Generation Partnership Project (3GPP) access node or non-3GPP access point. The network nodes 710 facilitate direct or indirect connection of user equipment (UE), such as by connecting UEs 712*a*, 712*b*, 712*c*, and 712*d* (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunications network 702 may support network slicing to provide different logical networks to different devices that are connected to the telecommunication network 702. For example, the telecommunications network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 714 communicates with the access network 704 to facilitate indirect communication between one or more UEs (e.g., UE 712*c* and/or 712*d*) and network nodes (e.g., network node 710*b*). In some examples, the hub 714 may be a controller, router, content source and analytics, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a VR headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular in if one or more of the UEs are low energy IoT devices.

The hub 714 may have a constant/persistent or intermittent connection to the network node 710b. The hub 714 may also allow for a different communication scheme and/or schedule between the hub 714 and UEs (e.g., UE 712c and/or 712d), and between the hub 714 and the core network 706. In other examples, the hub 714 is connected to the core network 706 and/or one or more UEs via a wired connection. Moreover, the hub 714 may be configured to connect to an M2M service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710b. In other embodiments, the hub 714 may be a non-dedicated hub—that is, a device which is capable of operating to route communications between the UEs and network node 710b, but which is additionally capable of operating as a communication start and/or end point for certain data channels.

Figure 8:
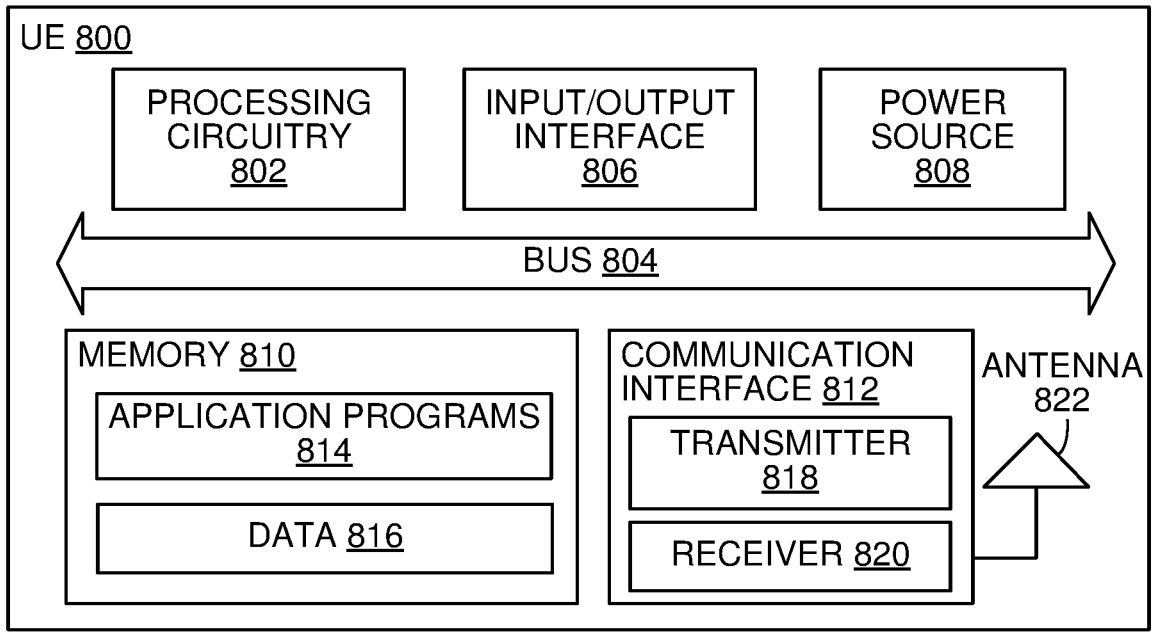
FIG. 8 is a block diagram of a user equipment in accordance with some embodiments

FIG. 8 shows a UE 800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 802 is configured to process instructions and data and may be configured to implement any sequential state machine operative to execute instructions stored as machine-readable computer programs in the memory 810. The processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 802 may include multiple central processing units (CPUs).

In the example, the input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 808 is structured as a battery or battery pack. Other types of power sources, such as an external power source (e.g., an electricity outlet), photovoltaic device, or power cell, may be used. The power source 808 may further include power circuitry for delivering power from the power source 808 itself, and/or an external power source, to the various parts of the UE 800 via input circuitry or an interface such as an electrical power cable. Delivering power may be, for example, for charging of the power source 808. Power circuitry may perform any formatting, converting, or other modification to the power from the power source 808 to make the power suitable for the respective components of the UE 800 to which power is supplied.

The memory 810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 810 includes one or more application programs 814, such as an operating system, web browser application, a widget, gadget engine, or other application, and corresponding data 816. The memory 810 may store, for use by the UE 800, any of a variety of various operating systems or combinations of operating systems.

The memory 810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 810 may allow the UE 800 to access instructions, application programs and the like, stored on transitory or non-transitory memory media, to off-load data, or to upload data. An article of manufacture, such as one utilizing a communication system may be tangibly embodied as or in the memory 810, which may be or comprise a device-readable storage medium.

The processing circuitry 802 may be configured to communicate with an access network or other network using the communication interface 812. The communication interface 812 may comprise one or more communication subsystems and may include or be communicatively coupled to an antenna 822. The communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, the transmitter 818 and receiver 820 may be coupled to one or more antennas (e.g., antenna 822) and may share circuit components, software or firmware, or alternatively be implemented separately.

In the illustrated embodiment, communication functions of the communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
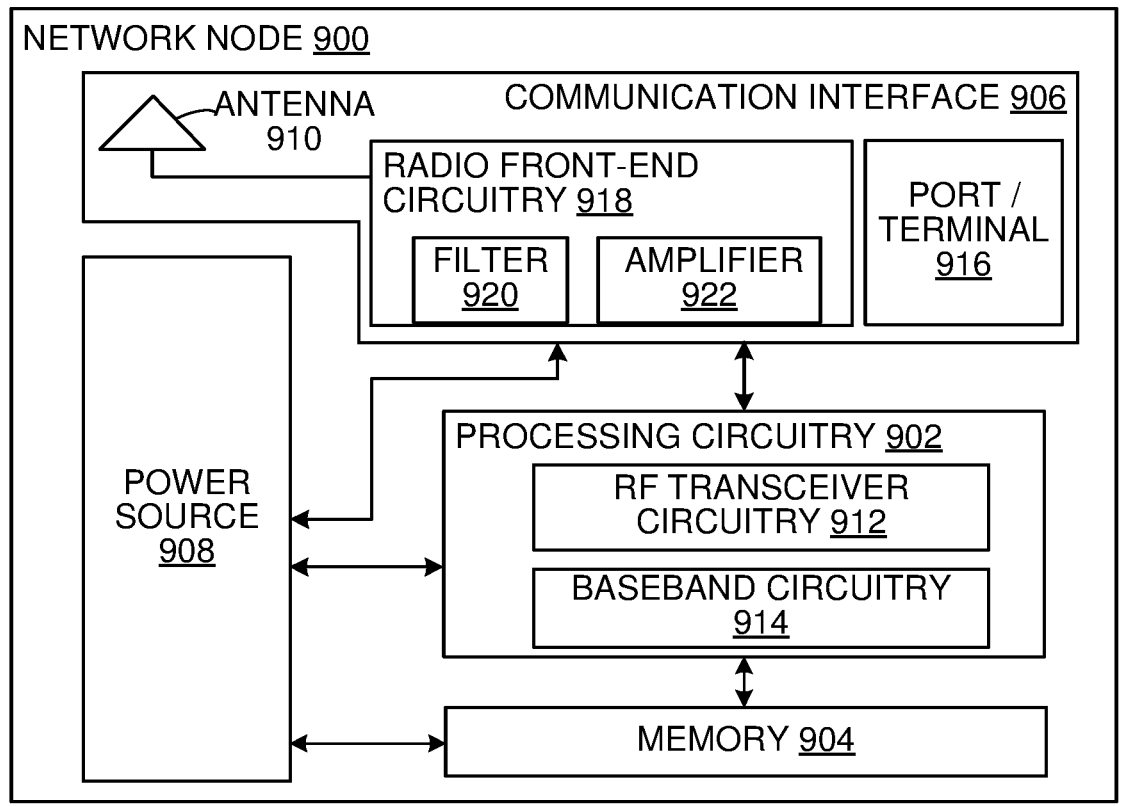
FIG. 9 is a block diagram of a network node in accordance with some embodiments.

FIG. 9 shows a network node 900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 900 includes a processing circuitry 902, a memory 904, a communication interface 906, and a power source 908. The network node 900 may be composed of multiple physically separate components (e.g., a NodeB component and a RNC component, or a BTS component and a BSC component, etc.), which may each have their own respective components. In certain scenarios in which the network node 900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 900 may be configured to support multiple radio access technologies (RATs). In such embodiments, some components may be duplicated (e.g., separate memory 904 for different RATs) and some components may be reused (e.g., a same antenna 910 may be shared by different RATs). The network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

The processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as the memory 904, to provide network node 900 functionality.

In some embodiments, the processing circuitry 902 includes a system on a chip (SOC). In some embodiments, the processing circuitry 902 includes one or more of radio frequency (RF) transceiver circuitry 912 and baseband processing circuitry 914. In some embodiments, the radio frequency (RF) transceiver circuitry 912 and the baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

The memory 904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 902. The memory 904 may store any suitable instructions, data, or information, including a computer program, software, an application including one or more of logic, rules, code, tables, and/or other instructions capable of being executed by the processing circuitry 902 and utilized by the network node 900. The memory 904 may be used to store any calculations made by the processing circuitry 902 and/or any data received via the communication interface 906. In some embodiments, the processing circuitry 902 and memory 904 is integrated.

The communication interface 906 is used in wired or wireless communication of signaling and/or data between a network node, access network, and/or UE. As illustrated, the communication interface 906 comprises port(s)/terminal(s) 916 to send and receive data, for example to and from a network over a wired connection. The communication interface 906 also includes radio front-end circuitry 918 that may be coupled to, or in certain embodiments a part of, the antenna 910. Radio front-end circuitry 918 comprises filters 920 and amplifiers 922. The radio front-end circuitry 918 may be connected to an antenna 910 and processing circuitry 902. The radio front-end circuitry may be configured to condition signals communicated between antenna 910 and processing circuitry 902. The radio front-end circuitry 918 may receive digital data that is to be sent out to other network nodes or UEs via a wireless connection. The radio front-end circuitry 918 may convert the digital data into a radio signal having the appropriate channel and bandwidth parameters using a combination of filters 920 and/or amplifiers 922. The radio signal may then be transmitted via the antenna 910. Similarly, when receiving data, the antenna 910 may collect radio signals which are then converted into digital data by the radio front-end circuitry 918. The digital data may be passed to the processing circuitry 902. In other embodiments, the communication interface may comprise different components and/or different combinations of components.

In certain alternative embodiments, the network node 900 does not include separate radio front-end circuitry 918, instead, the processing circuitry 902 includes radio front-end circuitry and is connected to the antenna 910. Similarly, in some embodiments, all or some of the RF transceiver circuitry 912 is part of the communication interface 906. In still other embodiments, the communication interface 906 includes one or more ports or terminals 916, the radio front-end circuitry 918, and the RF transceiver circuitry 912, as part of a radio unit (not shown), and the communication interface 906 communicates with the baseband processing circuitry 914, which is part of a digital unit (not shown).

The antenna 910 may include one or more antennas, or antenna arrays, configured to send and/or receive wireless signals. The antenna 910 may be coupled to the radio front-end circuitry 918 and may be any type of antenna capable of transmitting and receiving data and/or signals wirelessly. In certain embodiments, the antenna 910 is separate from the network node 900 and connectable to the network node 900 through an interface or port.

The antenna 910, communication interface 906, and/or the processing circuitry 902 may be configured to perform any receiving operations and/or certain obtaining operations described herein as being performed by the network node. Any information, data and/or signals may be received from a UE, another network node and/or any other network equipment. Similarly, the antenna 910, the communication interface 906, and/or the processing circuitry 902 may be configured to perform any transmitting operations described herein as being performed by the network node. Any information, data and/or signals may be transmitted to a UE, another network node and/or any other network equipment.

The power source 908 provides power to the various components of network node 900 in a form suitable for the respective components (e.g., at a voltage and current level needed for each respective component). The power source 908 may further comprise, or be coupled to, power management circuitry to supply the components of the network node 900 with power for performing the functionality described herein. For example, the network node 900 may be connectable to an external power source (e.g., the power grid, an electricity outlet) via an input circuitry or interface such as an electrical cable, whereby the external power source supplies power to power circuitry of the power source 908. As a further example, the power source 908 may comprise a source of power in the form of a battery or battery pack which is connected to, or integrated in, power circuitry. The battery may provide backup power should the external power source fail.

Embodiments of the network node 900 may include additional components beyond those shown in FIG. 9 for providing certain aspects of the network node's functionality, including any of the functionality described herein and/or any functionality necessary to support the subject matter described herein. For example, the network node 900 may include user interface equipment to allow input of information into the network node 900 and to allow output of information from the network node 900. This may allow a user to perform diagnostic, maintenance, repair, and other administrative functions for the network node 900.

Figure 10:
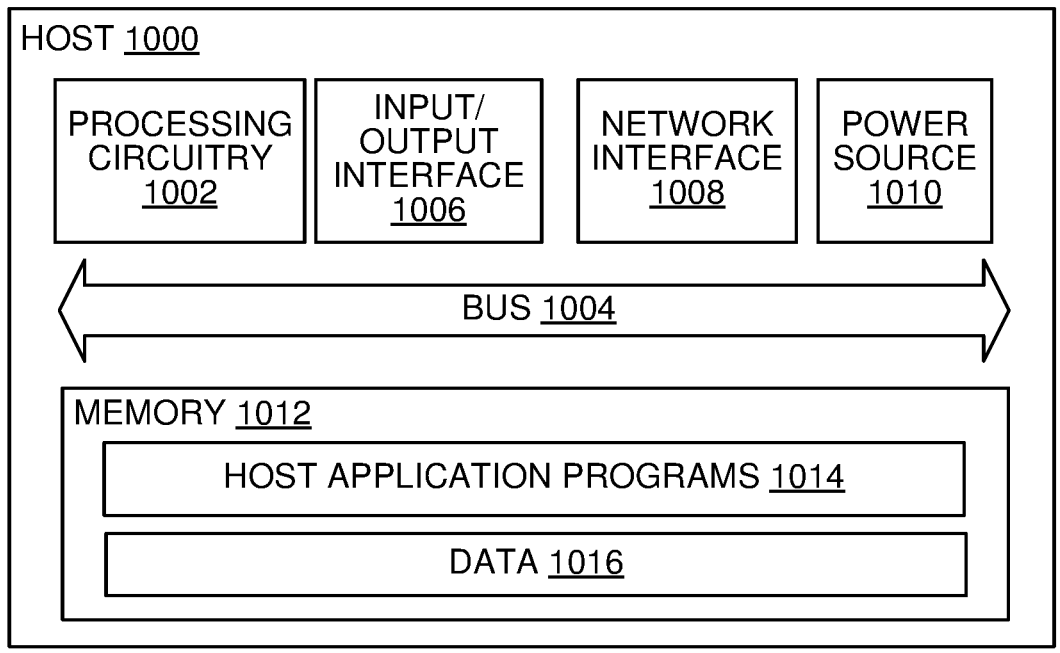
FIG. 10 is a block diagram of a host computer communicating with a user equipment in accordance with some embodiments.

FIG. 10 is a block diagram of a host 1000, which may be an embodiment of the host 716 of FIG. 7, in accordance with various aspects described herein. As used herein, the host 1000 may be or comprise various combinations hardware and/or software, including a standalone server, a blade server, a cloud-implemented server, a distributed server, a virtual machine, container, or processing resources in a server farm. The host 1000 may provide one or more services to one or more UEs.

The host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8-9, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of the host 1000 may utilize only a subset or all of the components shown. The host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of a core network. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
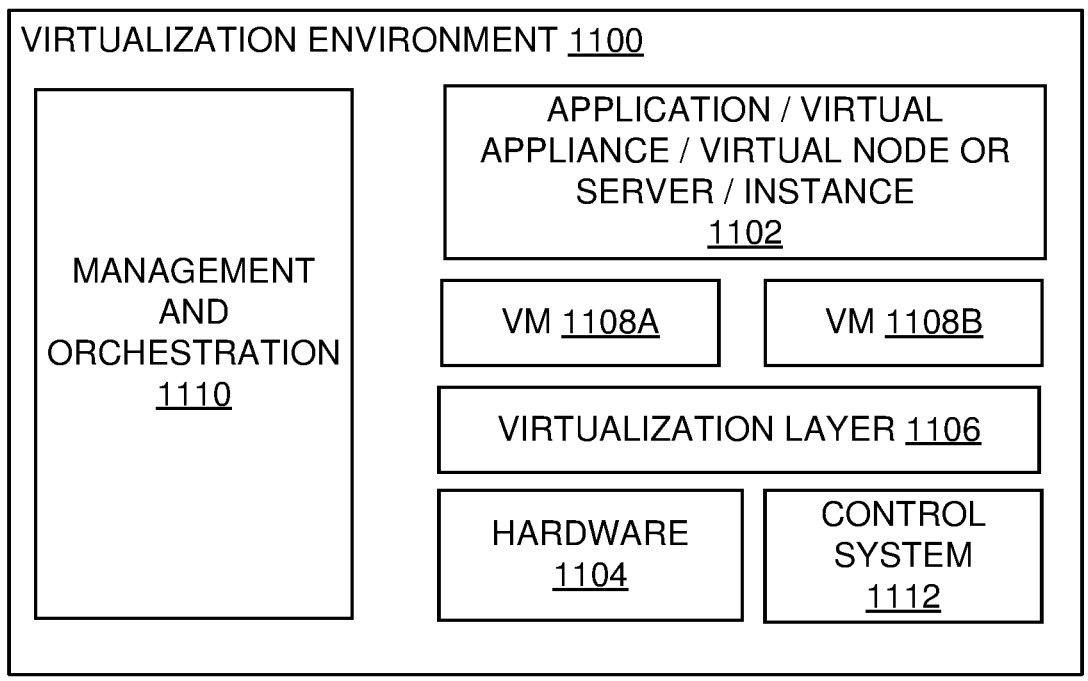
FIG. 11 is a block diagram of a virtualization environment in accordance with some embodiments.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1102 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs 1108a and 1108b (one or more of which may be generally referred to as VMs 1108), and/or perform any of the functions, features and/or benefits described in relation with some embodiments described herein. The virtualization layer 1106 may present a virtual operating platform that appears like networking hardware to the VMs 1108.

The VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1108 may be a software implementation of a physical machine that runs programs as if they were executing on a physical, non-virtualized machine. Each of the VMs 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of the hardware 1104 and corresponds to the application 1102.

Hardware 1104 may be implemented in a standalone network node with generic or specific components. Hardware 1104 may implement some functions via virtualization. Alternatively, hardware 1104 may be part of a larger cluster of hardware (e.g. such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

Figure 12:
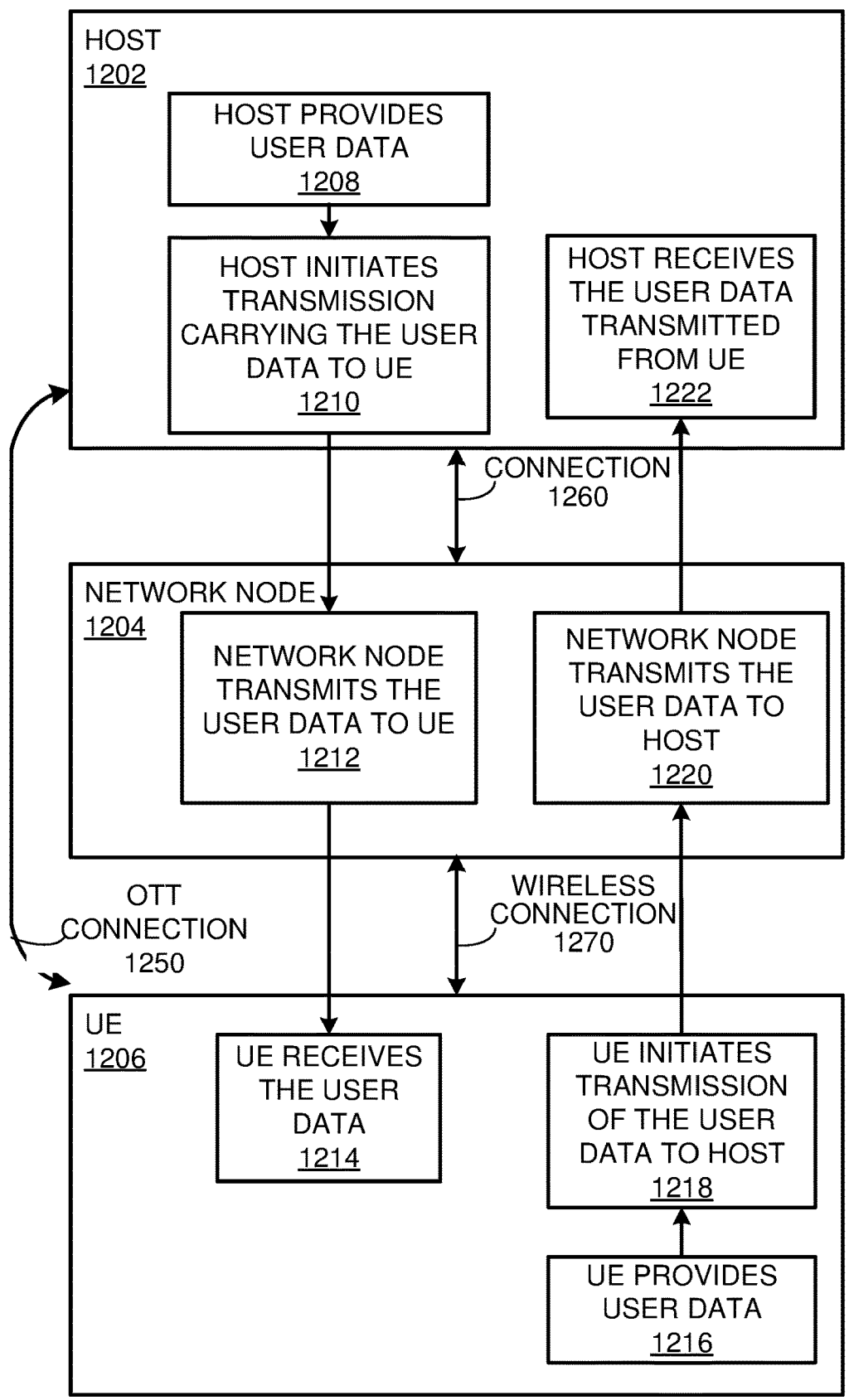
FIG. 12 is a block diagram of a host computer communicating via a base station with a user equipment over a partially wireless connection in accordance with some embodiments in accordance with some embodiments.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712a of FIG. 7 and/or UE 800 of FIG. 8), network node (such as network node 710a of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. The host 1202 also includes software, which is stored in or accessible by the host 1202 and executable by the processing circuitry. The software includes a host application that may be operable to provide a service to a remote user, such as the UE 1206 connecting via an over-the-top (OTT) connection 1250 extending between the UE 1206 and host 1202. In providing the service to the remote user, a host application may provide user data which is transmitted using the OTT connection 1250.

The network node 1204 includes hardware enabling it to communicate with the host 1202 and UE 1206. The connection 1260 may be direct or pass through a core network (like core network 706 of FIG. 7) and/or one or more other intermediate networks, such as one or more public, private, or hosted networks. For example, an intermediate network may be a backbone network or the Internet.

The UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of the host 1202. In the host 1202, an executing host application may communicate with the executing client application via the OTT connection 1250 terminating at the UE 1206 and host 1202. In providing the service to the user, the UE's client application may receive request data from the host's host application and provide user data in response to the request data. The OTT connection 1250 may transfer both the request data and the user data. The UE's client application may interact with the user to generate the user data that it provides to the host application through the OTT connection 1250.

The OTT connection 1250 may extend via a connection 1260 between the host 1202 and the network node 1204 and via a wireless connection 1270 between the network node 1204 and the UE 1206 to provide the connection between the host 1202 and the UE 1206. The connection 1260 and wireless connection 1270, over which the OTT connection 1250 may be provided, have been drawn abstractly to illustrate the communication between the host 1202 and the UE 1206 via the network node 1204, without explicit reference to any intermediary devices and the precise routing of messages via these devices.

As an example of transmitting data via the OTT connection 1250, in step 1208, the host 1202 provides user data, which may be performed by executing a host application. In some embodiments, the user data is associated with a particular human user interacting with the UE 1206. In other embodiments, the user data is associated with a UE 1206 that shares data with the host 1202 without explicit human interaction. In step 1210, the host 1202 initiates a transmission carrying the user data towards the UE 1206. The host 1202 may initiate the transmission responsive to a request transmitted by the UE 1206. The request may be caused by human interaction with the UE 1206 or by operation of the client application executing on the UE 1206. The transmission may pass via the network node 1204, in accordance with the teachings of the embodiments described throughout this disclosure. Accordingly, in step 1212, the network node 1204 transmits to the UE 1206 the user data that was carried in the transmission that the host 1202 initiated, in accordance with the teachings of the embodiments described throughout this disclosure. In step 1214, the UE 1206 receives the user data carried in the transmission, which may be performed by a client application executed on the UE 1206 associated with the host application executed by the host 1202.

In some examples, the UE 1206 executes a client application which provides user data to the host 1202. The user data may be provided in reaction or response to the data received from the host 1202. Accordingly, in step 1216, the UE 1206 may provide user data, which may be performed by executing the client application. In providing the user data, the client application may further consider user input received from the user via an input/output interface of the UE 1206. Regardless of the specific manner in which the user data was provided, the UE 1206 initiates, in step 1218, transmission of the user data towards the host 1202 via the network node 1204. In step 1220, in accordance with the teachings of the embodiments described throughout this disclosure, the network node 1204 receives user data from the UE 1206 and initiates transmission of the received user data towards the host 1202. In step 1222, the host 1202 receives the user data carried in the transmission initiated by the UE 1206.

One or more of the various embodiments improve the performance of OTT services provided to the UE 1206 using the OTT connection 1250, in which the wireless connection 1270 forms the last segment. More precisely, the teachings of these embodiments may allow for the use of OAM in a deterministic network, and thereby provide benefits such as reduced data loss rates, reduced packet delay variation, and bounded latency for real-time applications.

In an example scenario, factory status information may be collected and analyzed by the host 1202. As another example, the host 1202 may process audio and video data which may have been retrieved from a UE for use in creating maps. As another example, the host 1202 may collect and analyze real-time data to assist in controlling vehicle congestion (e.g., controlling traffic lights). As another example, the host 1202 may store surveillance video uploaded by a UE. As another example, the host 1202 may store or control access to media content such as video, audio, VR or AR which it can broadcast, multicast or unicast to UEs. As other examples, the host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1250 between the host 1202 and UE 1206, in response to variations in the measurement results. The measurement procedure and/or the network functionality for reconfiguring the OTT connection may be implemented in software and hardware of the host 1202 and/or UE 1206. In some embodiments, sensors (not shown) may be deployed in or in association with other devices through which the OTT connection 1250 passes; the sensors may participate in the measurement procedure by supplying values of the monitored quantities exemplified above, or supplying values of other physical quantities from which software may compute or estimate the monitored quantities. The reconfiguring of the OTT connection 1250 may include message format, retransmission settings, preferred routing etc.; the reconfiguring need not directly alter the operation of the network node 1204. Such procedures and functionalities may be known and practiced in the art. In certain embodiments, measurements may involve proprietary UE signaling that facilitates measurements of throughput, propagation times, latency and the like, by the host 1202. The measurements may be implemented in that software causes messages to be transmitted, in particular empty or 'dummy' messages, using the OTT connection 1250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method performed by a relay node of a deterministic network, DetNet, for providing operation, administration, and maintenance, OAM, for the DetNet, the method comprising:
   receiving, via a communication path used by a data flow, a first OAM message comprising an indication of a target node;

responsive to receiving the first OAM message, determining whether the relay node is the target node; and when the relay node is not the target node, performing, based on determination of a function that the relay node is configured to perform, a packet elimination function, PEF, comprising determining whether a copy of the first OAM message has been previously received by the relay node based on a value comprised in the first OAM message that is distinct from a data flow specific sequence number associated with data packets of the data flow, and transmitting a second OAM message, or preventing the first OAM message from being forwarded to another relay node, based on the determination whether a copy of the first OAM message has been previously received by the relay node.

2. The method of claim 1, wherein the relay node is further configured to perform a packet replication function, PRF, and the method comprising:

forwarding the first OAM message over multiple DetNet flow specific member flow paths to multiple nodes in the DetNet.

3. The method of claim 1, further comprising:

checking the value comprised in the first OAM message that is associated with an originator of the first OAM message, and responsive to determining that a copy of the first OAM message has not been previously received by the relay node, transmitting the second OAM message.

4. The method of claim 3, further comprising:

receiving, after receiving the first OAM message, a third OAM message including the value;

determining that the third OAM message is a copy of the first OAM message based on the value included in the third OAM message; and preventing the third OAM message from being forwarded to another relay node based on the determination that the third OAM message is a copy of the first OAM message.

5. The method of claim 3, wherein receiving the first OAM message comprises receiving the first OAM message from the originator of the OAM message.

6. The method of claim 1, wherein the first OAM message comprises a DetNet-Echo-Request message, and wherein the value comprises an OAM specific ping sequence number.

7. The method of claim 1, further comprising: when the relay node is the target node, transmitting the second OAM message to a source of the first OAM message, the second OAM message being different than the first OAM message.

8. The method of claim 7, wherein the second OAM message comprises a DetNet-Echo-Reply packet that includes at least one of: an indicator of an identity of the relay node; an indicator of an ingress and/or egress flow related configuration; and a status of a service sub-layer function.

9. A network entity of a deterministic network, DetNet, for providing operation, administration, and maintenance, OAM, for the DetNet, the network entity comprising:

processing circuitry; and memory coupled to the processing circuitry and having instructions stored therein that are executable by the processing circuitry to cause the network entity to perform operations comprising claim 1.

10. A non-transitory computer-readable medium having instructions stored therein that are executable by processing circuitry of a network entity of a deterministic network, DetNet, to cause the network entity to perform operations comprising claim 1.

11. The method of claim 1, further comprising:

responsive to determining that a copy of the first OAM message has been previously received by the relay node, preventing the first OAM message from being forwarded to another relay node.

12. The method of claim 1, wherein the second OAM message comprises a DetNet-Echo-Reply packet that includes at least one of: an indicator of an identity of the relay node, an indicator of an ingress flow related configuration, and an indicator of an egress flow related configuration.

13. A method performed by an origination node of a deterministic network, DetNet, for providing operation, administration, and maintenance, OAM, for the DetNet, the method comprising:

generating a first OAM message comprising an indication of a target node and a value indicating whether a copy of the first OAM message has been previously transmitted to the relay node;

transmitting the first OAM message to a relay node via a communication path shared with a data flow, wherein the value comprised in the first OAM message is distinct from a data flow specific sequence number associated with data packets of the data flow; and when the relay node is the target node, receiving a second OAM message from the target node responsive to the first OAM message.

14. The method of claim 13, wherein the value is associated with the origination node.

15. The method of claim 14, wherein the first OAM message comprises a DetNet-Echo-Request message, and wherein the value comprises an OAM specific ping sequence number.

16. The method of claim 13, wherein the DetNet-Echo-Reply packet further includes a status of a service sub-layer function.

17. The method of claim 13, wherein the second OAM message comprises a DetNet-Echo-Reply packet that includes at least one of: an indicator of an identity of the relay node, an indicator of an ingress flow related configuration, and an indicator of an egress flow related configuration.

* * * * *